United States Patent [19]
Kurasawa

[11] 3,739,091
[45] June 12, 1973

[54] METHOD AND APPARATUS FOR DISPLAYING IMAGE AND MEASURING OBJECT THEREIN

[75] Inventor: Kazuo Kurasawa, Hamamatsu, Japan

[73] Assignee: Hamamatsu TV Co. Ltd., Hamatsu-shi, Shizuoka-ken, Japan

[22] Filed: Apr. 26, 1971

[21] Appl. No.: 137,365

[30] Foreign Application Priority Data
Apr. 24, 1970 Japan.............................. 45/34765

[52] U.S. Cl. .... 178/6.8, 178/DIG. 3, 178/DIG. 21, 178/DIG. 36
[51] Int. Cl........ H04n 5/06, H04n 5/22, H04n 7/18
[58] Field of Search.................... 178/6.8, DIG. 21, 178/DIG. 3, DIG. 36

[56] References Cited
UNITED STATES PATENTS
3,491,200  1/1970  Wisnieff.......................... 178/6.8 X Primary Examiner—Howard W. Britton
Attorney—Robert E. Burns and Emmanuel J. Lobato

[57] ABSTRACT

A method and device for displaying an image including an object to be measured on the screen of a television receiver and for measuring movement and other characteristics of the object in a measuring device so composed that a region of the image including the object is locally scanned for a predetermined number of times in each flyback period between consecutive horizontal scannings for the whole area of the image, a first video signal thus obtained by the scannings of the whole area of the image being supplied to the receiver to be displayed therein, and a second video signal obtained by the local scannings of the region being supplied to the measuring device.

2 Claims, 8 Drawing Figures

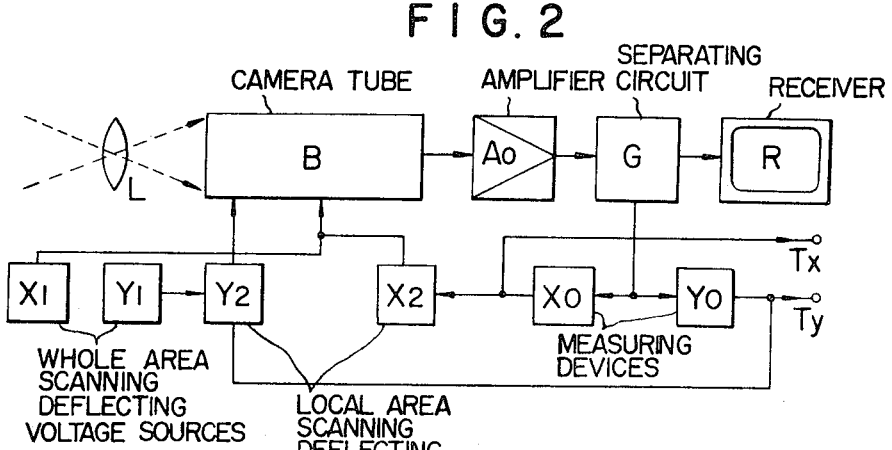
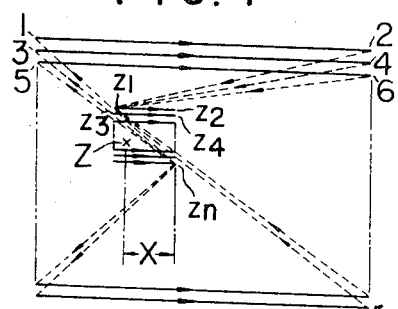
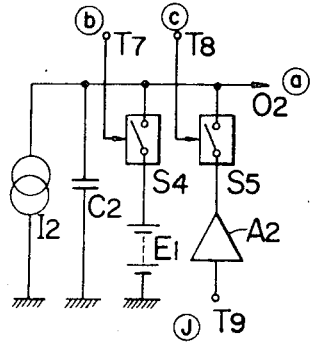
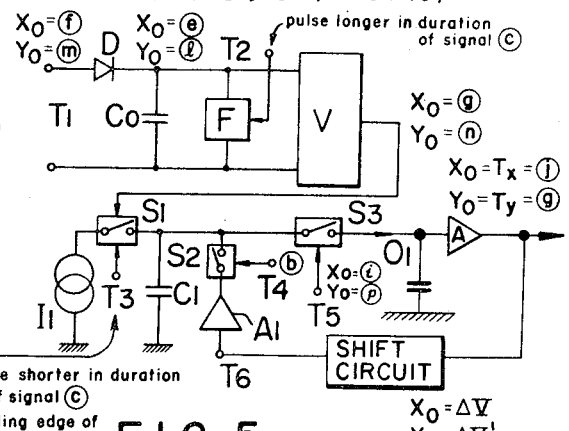
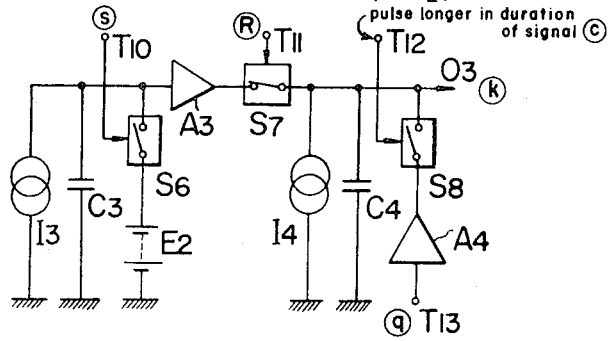

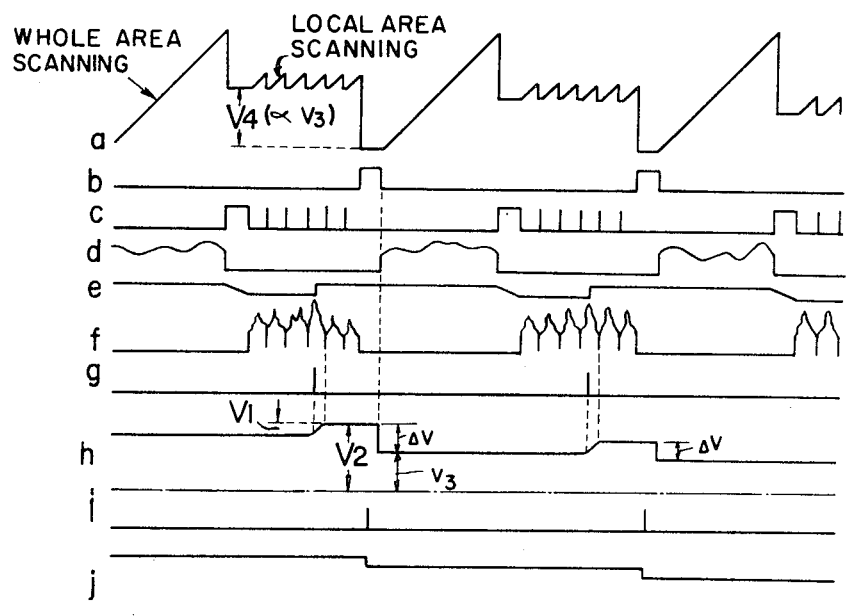
FIG. 6
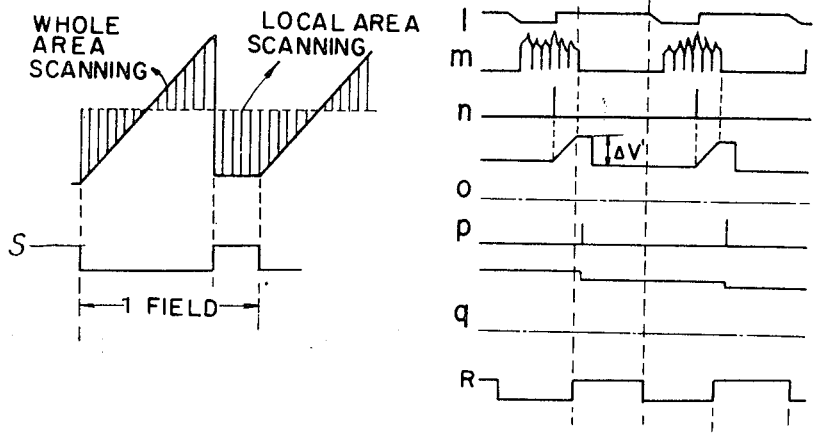
FIG. 7
FIG. 8

METHOD AND APPARATUS FOR DISPLAYING IMAGE AND MEASURING OBJECT THEREIN

BACKGROUND OF THE INVENTION

This invention relates generally to television techniques, and more particularly to a method and apparatus for displaying an image and for measuring the movement or variation of a specific object included in the image. According to the present invention, various parameters such as positions, displacement, speed, acceleration, vibration, rotation, size, length, and brightness of the object can be measured in a non-contacting manner (remotely).

It is widely known that, by means of a television device, a picture including an object to be measured is visualized, and, at the same time, signals representing the condition of the object can also be extracted from the video signals, whereby measurements of various parameters relating thereto can be accomplished in a non-contacting manner and at high speed. Such a device makes it possible to observe an image of the picture on a television receiver screen and to control the movement of a television camera from a remote station.

Since the condition or movement of an object can be measured in such a device while the environmental area thereof is observed, the measured results are highly reliable and any singularity in variation of the condition can be detected instantaneously.

However, in the device of this kind heretofore proposed, the frequency for the measurement could not be elevated above the frame frequency of the image. Furthermore, when the displacement or variation speed of the object is sufficiently high, and a frequency of measurement of more than 10 KHz is required, a frequency band of the television signal of several hundred MHz is required. The reason for this is that the frame recurrence frequency must be higher than the measurement frequency, and as a result, the whole device is rendered impracticable. Furthermore, any attempt to decrease the number of scanning lines in the image for allowing the elevation of the frame recurrence frequency, will give rise to a degradation of the resolution of the image and also a deterioration of the accuracy of the measurement.

SUMMARY OF THE INVENTION

Therefore, a primary object of the present invention is to provide a method and apparatus for practicing the method, wherein the measuring speed of an object in the image can be elevated several hundreds of times that of the conventional practice without an accompanying deterioration of the resolution and expansion of the band width.

Another object of the present invention is to provide a method and apparatus for practicing the method, wherein local scannings for the object to be measured are carried out between each consecutive pairs of horizontal scannings, and the measurement of the position, movement, size, length, brightness, and the like of the object to be measured is undertaken while the image is observed, by utilizing video signals obtained from the local scannings.

Still another object of the present invention is to provide a method and apparatus for practicing the method, wherein, when there are a number of objects of small area included in an image, any one of the objects of preferably higher brightness may be selected, by employing, for instance, a light pen, to start local scanning of the object and to measure the movement or the like of the object thus selected.

According to the present invention in one aspect thereof, there is provided a method for displaying an image and for measuring movements and the like of an object included in the image, which comprises the steps of scanning, in each flyback period of the horizontal scanning, a region including the object to be measured at a scanning frequency higher than the horizontal scanning frequency of the image, supplying video signals obtained by scanning the whole area of the image to a television receiver to be displayed on the screen thereof, and supplying other video signals obtained by the local scanning of said small region to a measuring device.

According to the present invention, in another aspect thereof, there is further provided apparatus for displaying an image and simultaneously measuring an object included in the image, comprising a television camera tube for generating a video signal by scanning the whole area of an image and another video signal by scanning a local area of the image, a signal separating circuit for separating the output signal from the camera tube into said first video signal and said second video signal, a television receiver to which the first video signal is applied, first and second measuring devices which extract signals for a brightest point within the locally scanned region from the second video signal and produce respectively first and second voltages corresponding to the coordinates of the brightest point, horizontal and vertical deflection voltage sources which, upon the application of said first and second voltages, produce horizontal and vertical deflection voltages for the local scanning, and whole area scanning horizontal and vertical deflection voltage sources which generate horizontal and vertical deflecting voltages for the whole area scanning.

The nature, principle, and utility of the invention will be more clearly understood from the following detailed description when read in conjunction with the accompanying drawings.

BRIEF DESCRIPTION OF THE DRAWINGS

In the drawings:

FIG. 1 is a diagram showing a trace of scanning lines in a television camera employed in an image displaying and measuring apparatus according to the present invention;

FIG. 2 is a block diagram of a preferred embodiment of the present invention;

FIGS. 3, 4, and 5 are schematic diagrams showing component circuits in the device indicated in FIG. 2; and FIGS. 6, 7, and 8 are waveform diagrams for clarifying the operation of the present invention.

DETAILED DESCRIPTION

Referring now to FIG. 1, there is indicated a trace of horizontal scanning lines employed in a television camera, wherein flyback portions of the trace, which are to be blanked out, are indicated by dotted lines. From the leftward upper part of an image, the image plane is scanned horizontally as indicated by a line 1–2, and thereafter the scanning electron beam is shifted to a point $z_1$ near an object point Z to be measured, starting to scan a narrow region including the point Z as indicated by $z_1 - z_2 - z_3 \ldots z_n$ at a higher scanning frequency than the horizontal scanning frequency for the image plane.

From the point $z_n$, the scanning electron beam is caused to fly back to a point 3 located just under the point 1, from where the image plane is scanned again from 3 to 4. From the point 4, the electron beam is again shifted to the point $z_1$ near the point Z and the narrow region is scanned along the path $z_1 - z_2 - z_3 \ldots z_n$. The electron beam thereafter flies back to a point 5 just below the points 3 and horizontally scans the image plane as shown by 5-6. The above described sequence of operation is repeated until the electron beam arrives the point r and the narrow region is scanned as described before to complete 1 cycle of its scanning operation.

As is apparent from the above description, the narrow region including point Z is locally scanned at a higher frequency than that of the horizontal scanning frequency for the image plane in each flyback period of the horizontal scanning lines.

In FIG. 2, an embodiment of the invention for measuring the brightest point in the image plane is indicated in the form of a block diagram. In this apparatus, an image-dissector tube free from any residual image effect is employed for the camera tube B, and for the purpose of simplifying the construction thereof, electron beam deflecting electrodes of electrostatic type are utilized, and a push-pull beam deflecting voltage is applied to the electrodes.

On the photo-sensitive surface of the camera tube B, an image including the object point to be measured is focused through a lens system L, and an output video signal obtained therefrom is amplified in an amplifier AO and applied to a signal separating circuit G. The signal separating circuit G separates the signal into a first video signal related to the whole area of the image as represented by 1-2, 3-4, ..., and a second video signal locally scanned as indicated by $z_1 - z_2, z_3 - z_4, \ldots$ and related to the narrow region including the object point Z. The first video signal is thereafter applied to a television receiver R, while the second video signal is thereafter applied to measuring devices XO and YO.

The above described separation of the output signal can be easily achieved by providing a gate circuit which is rendered conductive or is blocked by a horizontal blanking signal employed for scanning the whole area of the image plane. The measuring devices XO and YO extract signals corresponding to the brightest point within the locally scanned region from the second video signal and deliver voltages corresponding to the horizontal coordinate and vertical coordinate for the position of the brightest point to terminals Tx and Ty, respectively. This part of the circuit is illustrated in FIG. 3.

The output signals of the XO and the YO devices are also applied respectively to a horizontal deflecting voltage source $X_2$ and a vertical deflecting voltage source $Y_2$, and the locally scanned region is thereby controlled so that the region always includes the object point Z to be measured. The local scanning deflecting voltages are superposed over the output voltages of the deflecting voltage sources $X_1$ and $Y_1$ for scanning the whole area of the image, respectively, or are switched over from the latter output voltages, and applied to the deflecting planar electrodes of the television camera tube B. The horizontal and vertical deflecting voltage sources are indicated in FIGS. 4 and 5, and waveforms of the horizontal and vertical deflecting voltages are indicated in FIGS. 7 and 8.

As is apparent from the trace of the scanning lines indicated in FIG. 1, a horizontal deflecting voltage as shown in FIG. 6(a) is applied to a deflecting electrode of the camera tube B. By the large saw-tooth wave portion of the horizontal deflecting voltage, a horizontal scanning line traversing the whole area of the image is obtained, and by the small saw-tooth waves, the local scannings of a region can be achieved. The number of the horizontal scanning lines contained in the total frame of an image is several hundreds as in the ordinary television system, and the number of the horizontal scanning lines in the local region is, for example, 8.

However, since the scanning area of the latter region is one several hundredths of the whole image area, a resolution of about the same order as that of the background image area can be obtained. Furthermore, since the oblique angles of the two kinds of saw-tooth wave portions are made equivalent, the band width required for the television signal can be maintained at an ordinary value. In this particular example, the flyback period between two adjacent horizontal scannings for the whole area of image is lengthened to a value of the order of one half of the scanning period.

FIG. 6(b) represents a horizontal deflection voltage source driving signal for the whole area scanning, and FIG. 6(c) shows a waveform including vertical and horizontal driving signals for the local scanning, the wider pulses corresponding to the former and the narrower pulses corresponding to the latter. The first video signal, as mentioned before, obtained by the whole area scanning of the image, is indicated in FIG. 6(d). When this video signal is applied to the receiver R in FIG. 1, the whole area background image is reproduced on the image surface of the receiver R. FIG. 6(e) shows a brightest point detecting wave-form in the locally scanned region, while FIG. 6(f) shows a video signal (second video signal) obtained by the local scanning and applied to the measuring devices XO and YO in FIG. 1.

When the video signal shown in FIG. 6 (f) is applied to the terminal $T_1$ in FIG. 3, the signal charges a capacitor Co through a diode D. The constant current discharge circuit F shown in FIG. 3 is normally opened, and the differentiating circuit V has a high input impedance. For this reason, the capacitor Co is maintained at a peak voltage within the video signal. When a vertical deflection driving signal for the local scanning is applied to the terminal $T_2$, the constant current discharge circuit F is operated, and the capacitor $C_o$ is discharged by a suitable amount. As a result, the voltage sustained at the level of the previous peak voltage in the video signal descends by this amount. When another peak voltage in the video signal is applied to the capacitor $C_o$, the voltage of the capacitor Co is again raised to a value equal to the newly arrival peak voltage, whereby a voltage waveform as indicated in FIG. 6(e) appears across the capacitor $C_o$. This voltage is differentiated in the differentiating circuit V, and a pulse train as shown in FIG. 6(g) is delivered from the output terminal.

It will be assumed that the object point Z to be measured shown in FIG. 1 is a brightest point in the region. Then, the above mentioned pulse is generated at an instant when such a point is scanned by the electron beam, and a switch $S_1$ is closed by each pulse included in the waveform of FIG. 6(g). To another terminal $T_3$ of the switch $S_1$, a horizontal deflection driving signal shown in FIG. 6(c) is applied, and the switch $S_1$ is opened by the same signal.

As a result, a current from a constant current source $I_1$ flows into a capacitor $C_1$ for a period starting from the arrival of a pulse in FIG. 6(g) to the arrival of the subsequent horizontal deflection driving signal. The increment $V_1$ of the terminal voltage of the capacitor $C_1$ corresponds to the distance X in FIG. 1 measured from the right edge of the local scanning region to the point Z.

Furthermore, a horizontal deflection driving signal, as shown in FIG. 6(b), for the whole area scanning is applied to another terminal $T_4$, and the trailing edge of the signal instantaneously closes the switch circuit $S_2$. The voltage built up across the capacitor $C_1$ is thus clamped to the output voltage of an amplifier $A_1$ having a low output impedance. The voltage waveform of the terminal voltage of the capacitor $C_1$ is represented by FIG. 6(h).

Likewise, a sampling pulse as shown in FIG. 6(i) is applied to a terminal $T_5$ at a suitable time instant in the horizontal deflection driving signal, and the switching circuit $S_3$ is instantaneously closed by this signal. A voltage corresponding to a voltage $V_2$ shown in FIG. 6(h) is stored at an output terminal $O_1$ and an output shown in FIG. 6(i) is obtained at the output of an amplifier A which has high input impedance and low output impedance. The output thus obtained is delivered out through the output terminal $T_x$ of the measuring device $X_0$. The output is a measurement output since it represents the horizontal relative position of the point Z to be measured with respect to the image area. Furthermore, as will be described with reference to FIGS. 4 and 5, the position of the following local scanning is determined by the application of a voltage $V_3$ to a terminal $T_6$ which results from shifting the output of the amplifier A by a constant voltage $\Delta V$ since the measurement on the object should be continued in correspondence to the output obtained at the terminal $T_x$. The reason why the shifting voltage $\Delta V$ is constant in value is that the start positions of local scanning must be constant when the point to be measured is stationary or at rest. The value of the constant voltage $\Delta V$ is the same as that of a voltage $V_1$ which is detected when the point to be measured is at the center of the local scanning range. From the above description, it will be apparent that the horizontal coordinate of the measured point $z_1$ as shown in FIG. 1 can be represented by an output from the terminal Tx. The measuring circuit $Y_0$ with respect to the vertical coordinate of the point Z to be measured is also composed and operated in the same way as described with reference to the measuring circuit $X_0$.

FIG. 7 shows a waveform of a vertical scanning wave. The saw-tooth wave portion thereof corresponds to the whole area scanning, and the pulsed portion thereof corresponds to one frame of the local scanning.

FIG. 8(k) shows one part of the waveform in FIG. 7 in a much enlarged scale, and FIG. 8(1) shows a waveform of a voltage built up across a capacitor Co in the measuring device YO. In FIGS. 8(m) and 8(n), there are indicated a video signal shown in FIG. 6(f) and a signal corresponding to the differentiated output as shown in FIG. 6(g).

That is, a horizontal deflection driving signal as shown in FIG. 6(b) is applied to the terminal $T_3$ in FIG. 3, for opening the switch circuit $S_1$ by the leading edge of the horizontal deflection driving signal. Thus, the voltage across the capacitor $C_1$ is varied as shown in FIG. 8(o), and this voltage is sampled by a pulse P similar to the pulse shown in FIG. 6(i). The crest value of the output pulse thus obtained is memorized, and an output as shown in FIG. 8(q) can be thereby obtained from the output terminal Ty shown in FIG. 2. This output represents the vertical coordinate of the position of an object point Z to be measured which is indicated in FIG. 1.

Referring back to FIG. 4, there are indicated circuit organizations of horizontal deflecting voltage sources $X_1$ and $X_2$ shown in FIG. 2, wherein a capacitor $C_2$ is charged by an output current from a constant current source $I_2$. A horizontal deflection driving signal for the whole area scanning as shown in FIG. 6(b) is applied to terminal $T_7$, local scanning driving signal as shown in FIG. 6(c) is applied to a terminal $T_8$, and switches $S_4$ and $S_5$ are closed respectively in response to these signals.

Furthermore, an output from a measuring device XO of a waveform as shown in FIG. 6(j) is applied to a terminal $T_9$, so that a voltage corresponding to the above mentioned output is obtained at an output terminal of an amplifier $A_2$ of a sufficiently low output impedance. When the switch $S_4$ is first closed by the signal as shown in FIG. 6(b), the voltage across the capacitor $C_2$ is clamped to a voltage from a d.c. voltage source $E_1$. When this switch is opened, the capacitor $C_2$ is charged by the current delivered from a constant current $I_2$, and the voltage across the capacitor $C_2$ is elevated linearly to form the obliquely rising portions of the sawtooth wave as shown in FIG. 6 (a).

Next, the switch $S_5$ is closed under the action of the local scanning driving signal as shown in FIG. 6(c), whereby the voltage of the capacitor $C_2$ is clamped to a value corresponding to the position of the object point Z occupied at the time of the previous local scanning. The voltage $V_4$ shown in FIG. 6(a) is this clamped voltage. When the switch $S_5$ is opened, the capacitor $C_2$ is charged by an output current of the constant current source $I_2$, and the voltage across the capacitor $C_2$ is built up linearly. However, because the switch $S_5$ is opened and closed with a short recurrence period, a saw-tooth wave of a minor amplitude as shown in FIG. 6(a) is thereby produced. By this procedure, deflecting voltage as shown in FIG. 6(a) can be delivered from the output terminal $O_2$ in FIG. 4.

FIG. 5 illustrates circuits related to the vertical deflection voltage sources $Y_1$ and $Y_2$ indicated in FIG. 2, wherein a capacitor $C_3$ is charged by an output current from a constant current source $I_3$, and, at the same time, a vertical deflection driving signal for the whole area scanning is applied to a terminal $T_{10}$, thereby causing a switch $S_6$ to close and clamping the capacitor voltage to that of a d.c. voltage source $E_2$. As a result, a voltage of a waveform corresponding to the saw-tooth wave portion shown in FIG. 7 appears at the output terminal of amplifier $A_3$ having a sufficiently low output impedance.

On the other hand, a blanking signal is applied to the terminal $T_{11}$ for a period corresponding to the flyback period of the whole area horizontal scanning line, so that a switch $S_7$ is opened by the blanking signal. Openning of the switch $S_7$ causes to deliver a saw-tooth wave lacking a signal portion indicated by a time interval $t$ in FIG. 8($k$), that is, the pulse portion shown in FIG. 7, from an output terminal $O_3$. Furthermore, a pulse of broad width in the waveform shown in FIG. 6($c$), in other words, a vertical deflection driving signal for the local scanning is applied to a terminal $T_{12}$, thus causing a switch $S_8$ to close, and an output signal from the measuring device YO shown in FIG. 2 is applied to a terminal $T_{13}$.

The latter causes a voltage corresponding to the output to appear at the output terminal of an amplifier $A_4$ having a low output impedance, whereby the voltage of the capacitor $C_4$ is clamped at every closure of the switch $S_8$. The capacitor $C_4$ is charged by an output current from a constant current source $I_4$. When the switch $S_7$ is opened, the switch $S_8$ is simultaneously closed, and the voltage of the capacitor $C_4$ is clamped to a value corresponding to the vertical coordinate of the object point Z at the time of the preceding local scanning. Whenever the switch $S_8$ is opened, the voltage of the capacitor $C_4$ rises linearly, and this voltage is delivered from the output terminal $O_3$.

However, when the switch $S_7$ closes, the output voltage of the amplifier $A_3$ is delivered from the output terminal $O_3$ regardless of the charged voltage of the capacitor $C_4$ because of the low output impedance of the amplifier $A_3$. Thus, the vertical deflection voltage as shown in FIG. 7 and FIG. 8($k$) can be delivered from the output terminal $O_3$.

As described above with respect to a preferred embodiment of the invention, according to a characteristic feature of the present invention, a local scanning of a narrow region is carried out after each horizontal scanning of the whole area of the image, whereby the measurement of the movement, size, length, brightness, and other characteristics of an object body can be carried out on the video signal obtained from the local scanning, while the object body is observed on an image screen of the receiver. Accordingly, the sampling period for the measurement can be reduced to that of horizontally scanning of the whole image width, and for this reason, the variation in the movement or condition of the object body can be measured with a precision several hundreds of times higher than that of the conventional apparatuses of this kind.

Furthermore, because of the narrow local scanning region, the shortcoming of lowering of the resolution due to the minor scanning lines can be eliminated, and at the same time, expansion of the required frequency band for transmitting the signal can be prevented. This is turn affords simplification of the organization of the apparatus, and the narrowness of the region affords discrimination of one object point from others when several of such points exist within the image plane. In the latter case any one of the object points, which is to be measured, can be appointed by the use of, for instance, a light pen, and the measurement can be carried out with the object point thus appointed and automatically followed within the local scanning region.

I claim:

1. A method of two-dimensionally measuring the motion of an object point while an image including the object point is displayed on a television-type monitor comprising: separating a scanning operation into both the scanning of the whole image area and the scanning of a small local region of the whole image area including therein the object point; scanning the whole image area at a given scanning frequency and obtaining a corresponding video signal; supplying the video signal obtained by the scanning of the whole image area to the television-type monitor to display the whole image; scanning the small local region plural times at the same scanning speed as that of the scanning of the whole image area during every flyback period between each consecutive pair of horizontal scannings during the scanning of the whole image area and at a frequency higher than said given scanning frequency and obtaining a corresponding video signal; and supplying the video signal obtained by the scanning of the small local region to a measuring circuit to effect measurement of the motion of the object point in said flyback period without increasing the video bandwidth.

2. An apparatus for measuring the motion of an object point while an image including the objectpoint is being displayed comprising: a television camera tube for scanning an image area and providing corresponding video signals; an image amplifier for amplifying the video signals; a signal separating circuit receptive of the amplified video signals from said image amplifier for separating the video signals obtained by the scanning of the whole image area and the scanning of a local region including the object point into a first video signal obtained by the scanning of the whole image area and a second video signal obtained by the scanning of the local region measuring means receptive of the second video signal for developing therefrom first and second voltage signals corresponding respectively to the horizontal and vertical positions of the object point; horizontal deflecting voltage generating means responsive to the first voltage signal for producing deflecting voltages effective to scan the thus obtained horizontal positions of the object point plural times in the flyback period between each consecutive pair of horizontal scannings and to scan the whole image area; and vertical deflecting voltage generating means responsive to the second voltage signal for producing deflecting voltages effective to carry out a scanning operation during a time of the scanning of the whole image area and to scan once in a vertical direction from the vertical position of the object point obtained by the measuring means in a period during which the horizontal scanning of the local area is carried out plural times in a horizontal direction.

* * * * *